United States Patent [19]
McClure et al.

[11] Patent Number: 4,901,510
[45] Date of Patent: Feb. 20, 1990

[54] ROTARY CROP FEED ASSIST DEVICE FOR A ROW CROP HARVESTING HEADER

[75] Inventors: John R. McClure; Gary L. Bich, both of New Holland, Pa.

[73] Assignee: Ford New Holland, Inc., New Holland, Pa.

[21] Appl. No.: 326,758

[22] Filed: Mar. 20, 1989

[51] Int. Cl.[4] ............................................ A01D 45/02
[52] U.S. Cl. ............................................ 56/98; 56/119
[58] Field of Search ............... 56/98, 94, 119, 14.1, 56/14.2, 13.7, 14.3

[56] References Cited

U.S. PATENT DOCUMENTS

| | | | |
|---|---|---|---|
| 3,388,538 | 6/1968 | Markham | 56/98 |
| 3,791,117 | 2/1974 | Lawrence | 56/98 |
| 3,803,820 | 4/1974 | Knapp | 56/98 |
| 3,831,356 | 8/1974 | Maiste et al. | 56/119 |
| 4,048,792 | 9/1977 | Shriver et al. | 56/98 |
| 4,115,983 | 9/1978 | Barnes et al. | 56/98 |
| 4,215,527 | 8/1980 | Shriver et al. | 56/98 |
| 4,249,366 | 2/1981 | Dolberg et al. | 56/98 |

FOREIGN PATENT DOCUMENTS

| | | | |
|---|---|---|---|
| 279039 | 12/1964 | Australia | 56/98 |
| 2807822 | 9/1978 | Fed. Rep. of Germany | 56/119 |

Primary Examiner—Stephen J. Novosad
Assistant Examiner—David J. Bagnell
Attorney, Agent, or Firm—Frank A. Seemar; Larry W. Miller; Darrell F. Marquette

[57] ABSTRACT

A rotary crop feed assist device mounted on a divider of a row crop harvesting header has a plurality of angularly spaced crop-engaging members projecting radially from a forwardly inclined rotational axis. The crop-engaging members are connected together at inner longitudinally-extending portions and have outer longitudinal edges which taper downwardly and inwardly toward the rotational axis. Their outer longitudinal edges sweep along a rotational path in the shape of an inverted truncated cone upon rotation of the device to impose a downward force on the crop material as it is being pulled into the discharge end of the row crop header past the feed assist device. In a modified embodiment, teeth-bearing extension members are fastened on the crop-engaging members and adjustable thereon toward and away from the rotational axis to vary the degree of exposure of the teeth in the row thereof past the outer longitudinal edges of the crop-engaging members and thereby the aggressiveness of the longitudinal edges in assisting the feeding of crop stalk material past the rotary device.

23 Claims, 3 Drawing Sheets

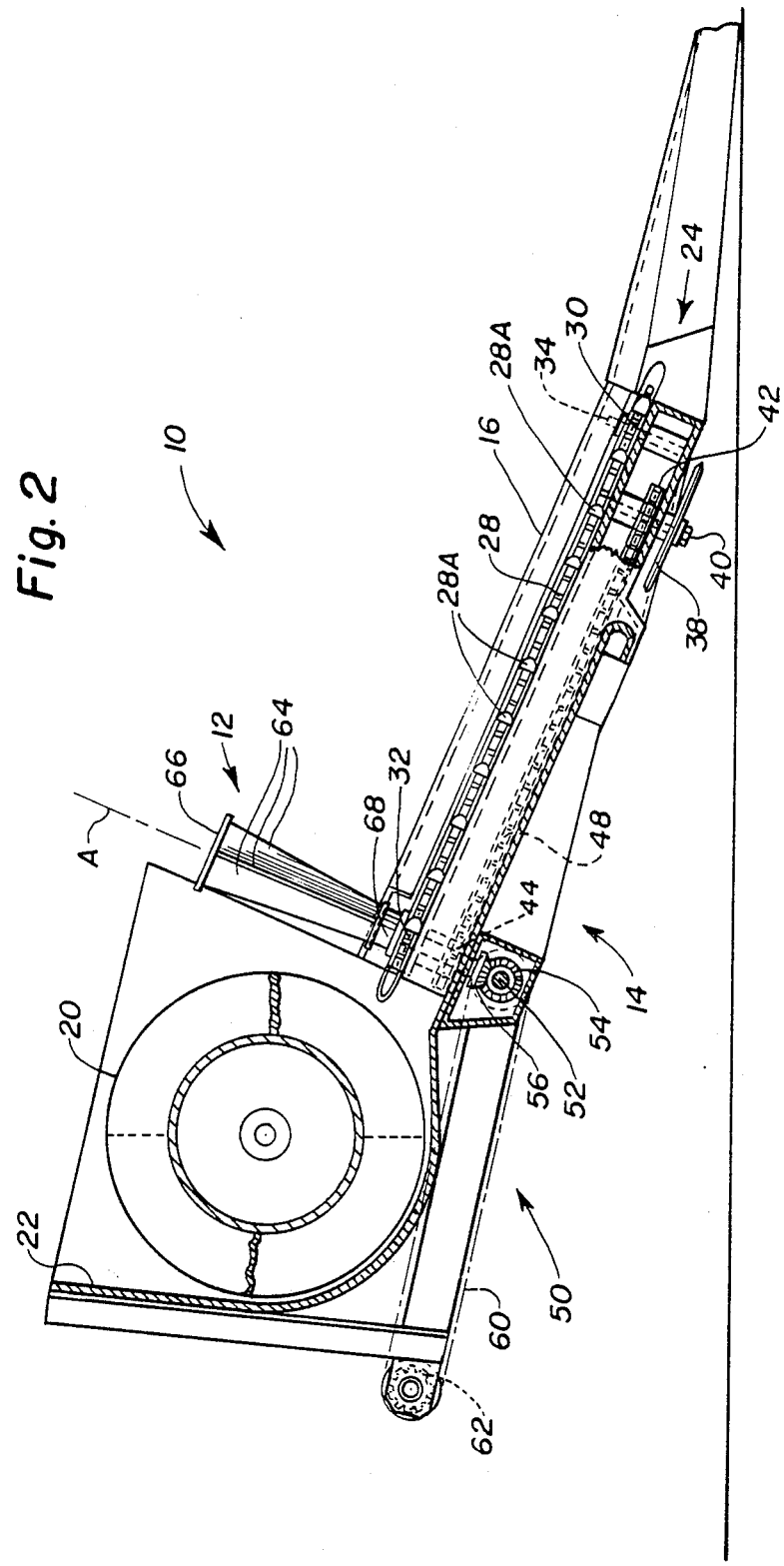

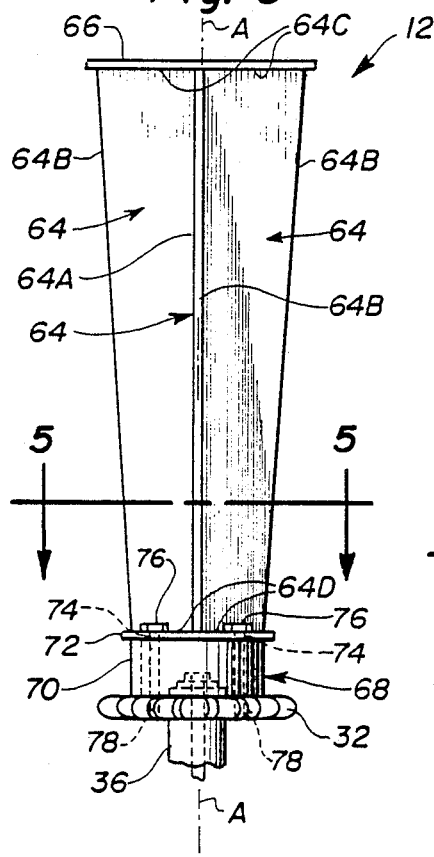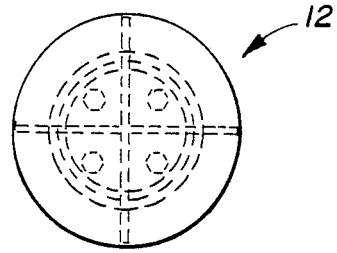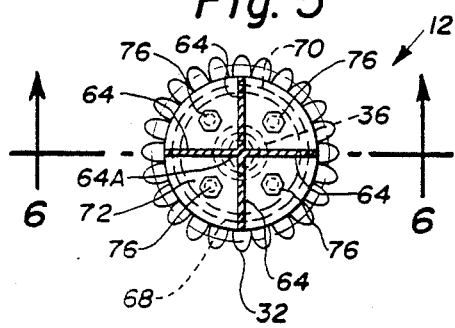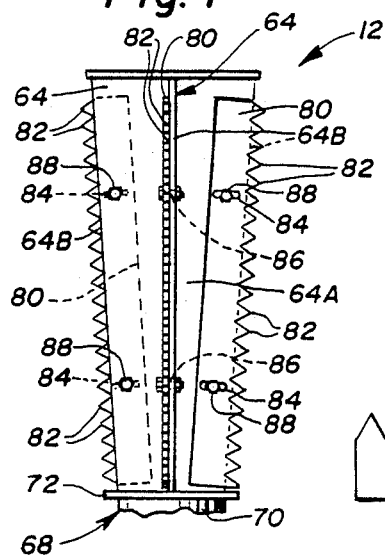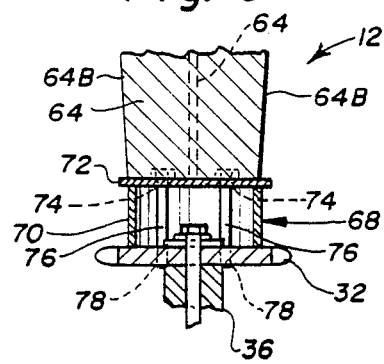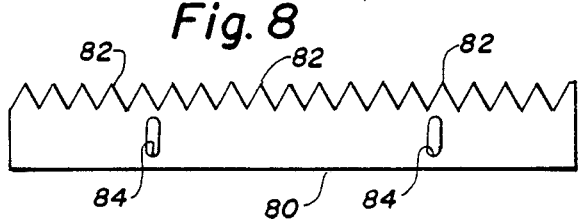

ROTARY CROP FEED ASSIST DEVICE FOR A ROW CROP HARVESTING HEADER

BACKGROUND OF THE INVENTION

1. Field of the Invention

The present invention relates generally to a row crop header for a forage harvester and, more particularly, is concerned with a rotary crop feed assist device on the header which sweeps a rotational path in the shape of an inverted truncated cone for imposing a downward force on crop stalk material being pulled into the header past the rotary device.

2. Description of the Prior Art

Row crop headers for forage harvesters are generally adapted to harvest row crops, such as corn, where some of stalks are down and bent over, extending across and entangled with stalks of an adjacent row. Such down crop condition creates a problem in harvesting in that as the crop dividers of the row crop header move between adjacent rows, the down stalks drape over the dividers. The draped-over portions of the stalks are dragged along and over the dividers as the stalks are conveyed rearwardly along passageways between the dividers by gathering chains. The gathering chains are adapted to grip lower portions of the stalks after they are severed and to feed the same butt end first into the forage harvester. The draped-over stalks tend to wrap around the dividers and bunch up about the rear end thereof, adjacent to the discharge throat of the row crop header. This wrapping and bunching of the stalks causes jamming, resulting in high power requirements and an uneven feeding of the stalks into the harvester. Further, many stalks are lost and damaged due to the binding of the stalks over the divider which tears some of the stalks apart and pulls others out of the grip of the gathering chains.

Row crop headers with various rotary crop feed assist devices mounted at the rearward ends of the outboard ones of the crop dividers have been proposed in the prior art. Representative of the prior art are the devices disclosed in U.S. Patents to Lawrence (U.S. Pat. No. 3,791,117), Markham (U.S. Pat. No. 3,388,538), Knapp (U.S. Pat. No. 3,803,820), Barnes et al (U.S. Pat. No. 4,115,983), Dolberg et al (U.S. Pat. No. 4,249,366) and Shriver et al (U.S. Pat. Nos. 4,048,792 and 4,215,527), the Shriver et al patents being assigned to the assignee of the present invention.

While these prior art devices tend to somewhat alleviate the problems experienced in harvesting down crops, problems in pulling in tangled stalks are still encountered. Consequently, a need still exists for improvements in the design of rotary crop feed assist devices to improve their performance.

SUMMARY OF THE INVENTION

The present invention provides a rotary crop feed assist device designed to satisfy the aforementioned needs. The rotary device of the present invention sweeps a rotational path in the shape of an inverted truncated cone to impose a downward force on crop stalk material being pulled into the header and thereby improves feeding of the stalk material.

More particularly, the rotary device has a plurality of angularly spaced crop-engaging members projecting radially from a forwardly inclined rotational axis. The members have outer longitudinal edges which taper downwardly and inwardly toward the rotational axis. The outer longitudinal tapered edges which sweep along the inverted cone-shaped rotational path upon rotation of the device impose the downward force on the crop material as it is being pulled into the discharge end of the row crop header past the rotary feed assist device.

In one embodiment of the rotary device, the outer longitudinal edges on the crop-engaging members of the rotary device are relatively straight and smooth for facilitating sliding of tangled crop stalk material downwardly along the longitudinal edges concurrently as the stalk material is pulled into the row crop header past the rotary device. In a modified embodiment of the rotary device, an extension member having a row of teeth defined along one edge thereof is releasably fastened on one or more of the crop-engaging members for adjustment toward and away from the rotational axis of the rotary device to vary the degree of exposure of the row of teeth past the longitudinal edge of the crop-engaging member. The extension members are used in severe down and tangled crop stalk conditions to make the longitudinal edges more aggressive in assisting the pulling in of tangled crop stalk material.

Further, the mechanism associated with the row crop header for feeding crop stalk material includes a plurality of forward and rear spaced apart sprockets and a plurality of gathering chains extending between and entrained about the sprockets. The rotary device has a base member by which it is attached upright on a rear one of the sprockets.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference made to the attached drawings in which:

FIG. 2 is a side elevational view of the header as seen along line 2—2 of FIG. 1, showing one of the outboard crop dividers of the header with the rotary crop feed assist device mounted thereon.

FIG. 3 is an enlarged elevational view of the rotary device shown mounted on an upper gathering chain sprocket of the outboard crop divider.

FIG. 4 is a top plan view of the rotary device of FIG. 3.

FIG. 5 is a cross-sectional view of the rotary device taken along line 5—5 of FIG. 3.

FIG. 6 is a fragmentary axial sectional view of the rotary device taken along line 6—6 of FIG. 5.

FIG. 7 is a side elevational view, on a smaller scale, of a modified embodiment of the rotary device having teeth-bearing extension members adjustably mounted on crop-engaging members of the device.

FIG. 8 is an enlarged elevational view of one of the teeth-bearing members of FIG. 7.

DETAILED DESCRIPTION OF THE INVENTION

Figure 1:
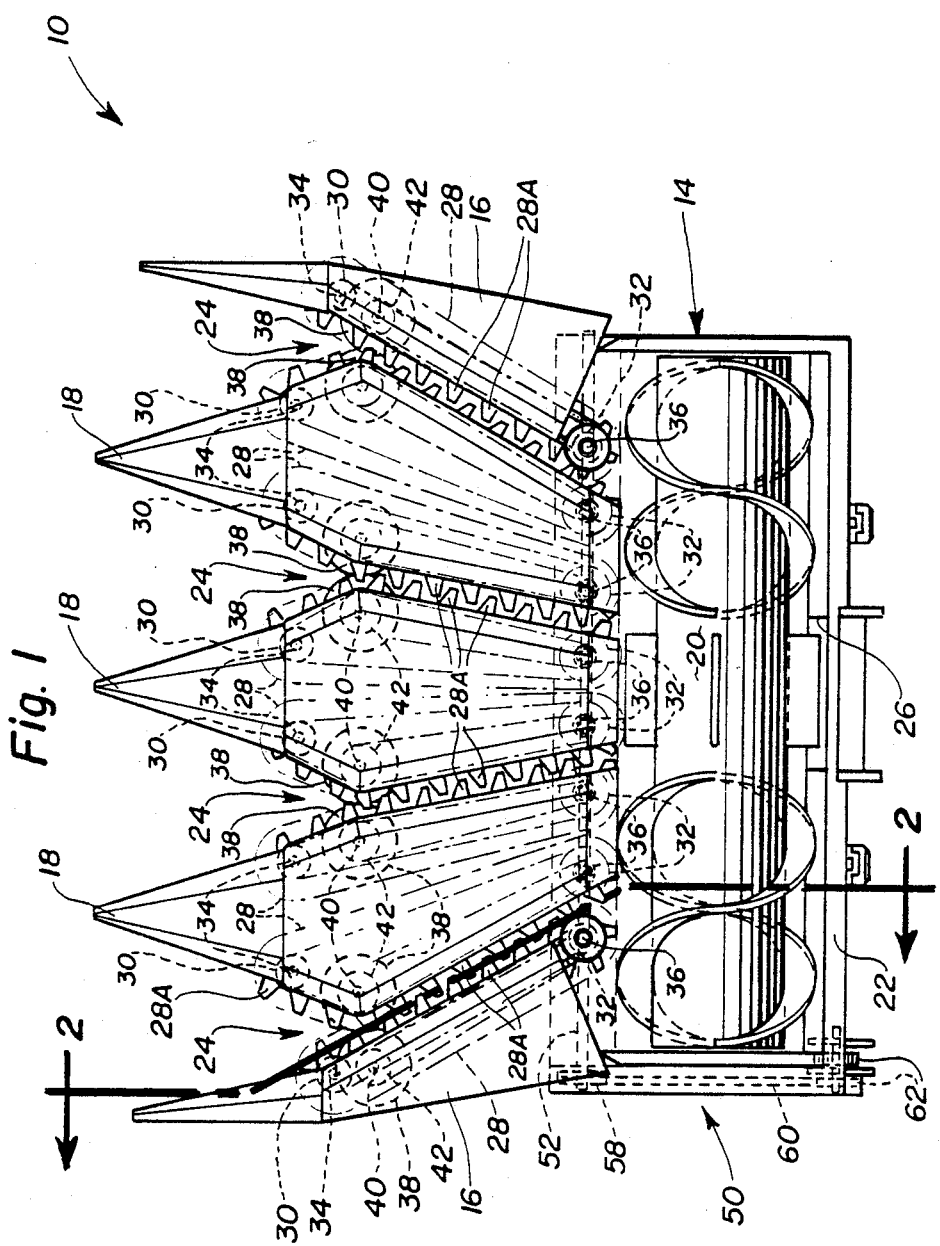
FIG. 1 is top plan view of a row crop header employing a pair of rotary crop feed assist devices on the outboard crop dividers of the header in accordance with the present invention.

In the following description, right hand and left hand references are determined by standing at the rear of the machine and facing in the direction of forward travel. Also, like reference numerals designate like or corresponding parts throughout the several views of the drawings. Further, it should be understood that such terms as "forward", "rearward", "left", "right", "upwardly", "downwardly", and the like, are words of convenience and are not to be construed as limiting terms.

In General

Referring now to the drawings, and particularly to FIGS. 1 and 2, there is illustrated a row crop harvesting header, being indicated generally by the numeral 10, having a pair of rotary crop feed assist devices 12 of the present invention. The row crop header 10 is adapted in a known manner for mounting on the forward portion of a crop harvesting machine, such as a forage harvester (not shown).

The forage harvester is conventional and forms no part of the present invention; thus, illustration and detailed description of the forage harvester are not necessary to fully understand the rotary crop feed assist device 12 of the present invention. Suffice it to say, at this point, that the forage harvester has a forward inlet opening, generally spanning the width thereof, with a feed roll assembly mounted rearwardly of the inlet opening. Crop material enters through the inlet opening to the feed roll assembly which feeds the material rearwardly to a rotating cutterhead for reducing the crop material.

As shown in FIGS. 1 and 2, the row crop harvesting header 10 includes a base frame 14, a pair of outboard crop dividers 16, a plurality of inboard crop dividers 18 located between the outboard dividers 16, and a crop material consolidating auger 20 and auger housing 22. The crop dividers 16, 18 are supported on the base frame 14 and extend forwardly in a downwardly-inclined manner from the frame, defining a plurality of crop material passageways 24 between them for receiving rows of crop as the harvesting machine advances through a field. The crop dividers 16, 18 are constructed of suitable material, such as sheet metal, providing smooth surfaces for guiding of crops thereover and therealong concurrently as the severed crop passes along the passageways 24.

The auger 20 and its housing 22 are supported transversely across the base frame 14 rearwardly of the crop dividers 16, 18. The auger housing 22 has a rear central discharge opening or outlet 26 aligned in communication with the forward inlet opening of the forage harvester and through which severed and gathered crop stalk material is feed from the row crop header 10 to the forage harvester.

The row crop header 10 also includes a plurality of cooperating gathering chains 28 disposed along opposite sides of the passageways 24 and entrained around forward and rear sprockets 30, 32 attached on forward and rear stub shafts 34, 36 which, in turn, are rotatably mounted on the base frame 14. The gathering chains 28 have lugs 28A which intermesh and project inwardly into the crop passageways between the dividers 16, 18 for engaging the crop therein and moving the same rearwardly toward the consolidating auger 20.

Also, for severing the standing crop stalks, the header 10 is provided with a cutting mechanism in the form of pairs of rotary discs 38 mounted on lower ends of another pair of forward stub shafts 40 and located adjacent to the entry ends of the crop passageways 24. The cutting peripheries of the respective discs 38 extend into the passageways 24 in an overlapping relationship to sever the crop as it enters the passageways. For driving the discs 38, forward and rear sprockets 42, 44 are respectively attached on forward stub shafts 40 and on the previously mentioned rear stub shafts 36 which also mount the gathering chain rear sprockets 32. Drive chains 48 are entrained about the respective sprockets 42, 44.

The rotary drive for the header 10 is provided from the harvesting machine via a drive train 50 which includes a transverse input shaft 52 rotatable mounted to the base frame 14 below the rear ends of the dividers 16, 18. The input shaft 52 has lower bevel gears 54 attached thereon which mesh with upper bevel gears 56 on the lower ends of the rear stub shafts 36 mounting the rear sprockets 32, 44 for the gathering chains and cutter discs. Mounted at the left end of the input shaft 52 is a sprocket 58 which is connected by a drive chain 60 to one of a pair of sprockets 62 rotatably mounted to the rear left corner of the base frame 14. The other of the sprockets 62 is provided for entraining a drive chain (not shown) from the harvesting machine. Thus, rotary power from the harvesting machine is transmitted through the drive train 50 and associated gears and sprockets to drive the gathering chains 28 such that their lugs 28 move rearwardly along the crop passageways and to rotate the cutting discs 38 in opposite directions to sever the standing crop.

Rotary Crop Feed Assist Device

For imposing a downward force on crop stalk material being pulled into the discharge outlet 26 of the header 10 and thereby improving crop material feeding, as seen in FIGS. 1 and 2 the rotary crop feed assist device 12 of the present invention is mounted above each of the rear ends of the outboard crop dividers 16. In a manner to be described below, the rotary device 12 is mounted for rotation about a generally upright axis, preferably one that is inclined forwardly and downwardly relative to the vertical. Also, as will be described below, the rotary device 12 has a peripheral configuration for sweeping a rotational path in the shape of an inverted truncated cone to impose the downward force on crop stalk material being fed or pulled past the rotary device to the rear discharge outlet 26 of the header 10.

More particularly, referring to FIGS. 3–6, the rotary device 12 is constructed of a plurality of flat, elongated, narrow, plate-like crop-engaging members 64 which are angularly displaced from one another and projecting radially from a central rotational axis A. The crop-engaging members 64 are connected together at longitudinal inner edge 64A thereof extending along the axis A. By way of example, four crop-engaging members 64 are illustrated, being angularly displaced approximately 90 degrees apart. Also, the crop-engaging members 64 have outer longitudinal edges 64B which taper downwardly and inwardly toward the rotational axis A and sweep along the inverted truncated cone-shaped rotational path upon rotation of the rotary device 12. Thus, the crop-engaging members 64 are wider at their upper edges 64C than at their lower edges 64D, and longer at their outer edges 64B than at their inner edges 64A. The inner edges 64A form substantially right angles with the upper and lower edges 64C, 64D.

As also seen in FIGS. 3-6, the rotary device 12 is also constructed of a top plate-like member 66 and bottom base member 68 of substantially circular configurations, with the top member 66 being larger in diameter than the base member 68. The top member 66 and bottom base member 68 structurally reinforce the arrangement of the crop-engaging members 64 by being rigidly attached across the upper and lower edges 64C, 64D thereof. The bottom base member 68 includes an annular cylindrical sleeve 70, rigidly attached to the underside of a circular plate 72 which, in turn, is rigidly attached to the lower edges 64D of the crop-engaging members 64.

The base member 68 is the part by which the rotary device 12 is mounted on the header 10. Specifically, the rotary devices 12 are disposed in upright orientations and attached directly on the rear sprockets 32 provided on rear stub shafts 36 for entraining the gathering chains 28 on the outboard dividers 16. The base member plate 72 has a series of holes 74 which receive a plurality of fasteners 76 in the form of threaded bolts which thread into holes 78 tapped in the rear sprocket 32, so as to rigidly, but releasably, attach the base member 68 and thereby the crop-engaging members 64 on the top of the rear sprocket 32. In view of such mounting arrangement, the rotary devices 12 rotate at the same speed as the gathering chains 28 move along the passageways 24 so as to provide for even feeding of crop material.

In the embodiment of the rotary device 12 in FIGS. 2-6, the outer longitudinal edges 64B on the crop-engaging members 64 are relatively straight and smooth for facilitating sliding of crop stalk material downwardly along the longitudinal edges 64B concurrently as the stalk material is fed by the gathering chains 28 past the rotary devices 12 into the discharge outlet 26 of header 10 via the consolidating auger 20.

In a modified embodiment in FIGS. 7 and 8, the above-described rotary device 12 further includes an elongated, narrow, plate-like extension member 80 on at least one, and preferably all, of the crop-engaging members 64. Each extension member 80 has a row of teeth 82 defined along one edge thereof. Each extension member 80 is releasably fastened on one of the crop-engaging members 64 inwardly from the longitudinal outer edge 64B thereon for adjustable movement toward and away from the rotational axis A, allowing the degree of extension and exposure of the teeth 82 in the row thereof past the respective outer longitudinal edge 64B of the crop-engaging member 64 can be varied and preset. In such manner, the degree of aggressiveness of outer longitudinal edge 64B on the crop-engaging member 64 in assisting the feeding of crop stalk material past the rotary device 12 can be varied and preset. The means for fastening the extension members 80 on the crop-engaging members 64 includes a plurality of elongated slots 84 formed in the extension members 80 which align with holes 86 formed in the crop-engaging members and a plurality of fasteners 88 which insert through the slots 84 and holes to rigidly fasten the extension members 80 to the crop-engaging members 64.

The extension members 80 can be used in severe down and tangled crop stalk conditions to make the outer longitudinal edges 64B of the crop-engaging members 64 more aggressive in assisting the pulling in of tangled crop stalk material.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

We claim:

1. In a row crop harvesting header having a rear discharge outlet, a plurality of laterally-spaced crop dividers and means for feeding crop stalk material rearwardly between said crop dividers and into said rear discharge outlet, the improvement comprising:
   a rotary crop feed assist device mounted for rotation about a generally upright axis on at least one of said crop dividers and having a peripheral configuration for sweeping a rotational path in the shape of an inverted truncated cone to impose a downward force on crop stalk material being fed past said device to said rear discharge outlet of said header.

2. The row crop header as recited in claim 1, wherein said rotary device includes a plurality of angularly displaced crop-engaging members projecting radially from said rotational axis.

3. The row crop header as recited in claim 2, wherein said crop-engaging members are angularly displaced approximately 90 degrees apart.

4. The row crop header as recited in claim 2, wherein said rotational axis is inclined forwardly and downwardly relative to the vertical.

5. The row crop header as recited in claim 2, wherein said crop-engaging members have outer longitudinal edges which taper downwardly and inwardly toward said rotational axis and sweep along said inverted truncated cone-shaped rotational path upon rotation of said device.

6. The row crop header as recited in claim 5, wherein said crop-engaging members are connected together at longitudinally-extending inner portions thereof.

7. The row crop header as recited in claim 5, wherein said outer longitudinal edges on said crop-engaging members are relatively straight and smooth for facilitating sliding of crop stalk material downwardly along said longitudinal edges concurrently as the stalk material is fed into said discharge outlet of said header past said members.

8. The row crop header as recited in claim 5, wherein said rotary device further includes:
   at least one extension member having a row of teeth defined along one edge thereof; and
   means for releasably fastening said extension member on one of said crop-engaging members for adjustable movement toward and away from said rotational axis to vary the degree of exposure of said teeth in said row thereof past said outer longitudinal edge of said crop-engaging member and thereby the aggressiveness of said longitudinal edge in assisting the feeding of crop stalk material past said device to said rear discharge outlet.

9. The row crop header as recited in claim 8, wherein said fastening means includes:
   means defining a plurality of elongated slots in one of said crop-engaging members and said extension member; and
   a plurality of fasteners mounted to the other of said crop-engaging members and said extension member and extending through said slots of said one of said crop-engaging members and said extension member.

10. The row crop header as recited in claim 1, wherein:
said feeding means includes a plurality of forward and rear spaced apart sprockets and a plurality of gathering chains extending between and entrained about said sprockets; and
said rotary device is attached upright on a rear one of said sprockets.

11. The row crop header as recited in claim 10, wherein said rotary device includes:
a base member; and
a plurality of fasteners releasably attaching said device at said base member upon said sprocket.

12. The row crop header as recited in claim 11, wherein said rotary device further includes a plurality of angularly spaced crop-engaging members rigidly attached upon said base member and projecting upwardly thereof and radially outward from said rotational axis.

13. The row crop header as recited in claim 12, wherein said crop-engaging members have outer longitudinal edges which taper downwardly and inwardly toward said rotational axis and sweep along said inverted truncated cone-shaped rotational path upon rotation of said device.

14. The row crop header as recited in claim 13, wherein said crop-engaging members are connected together at longitudinally-extending inner portions thereof.

15. The row crop header as recited in claim 13, wherein said outer longitudinal edges on said crop-engaging members are relatively straight and smooth for facilitating sliding of crop stalk material downwardly along said longitudinal edges concurrently as the stalk material is fed into discharge outlet of said header past said device.

16. The row crop header as recited in claim 13, wherein said rotary device further includes:
at least one extension member having a row of teeth defined along one edge thereof; and
means for releasably fastening said extension member on one of said crop-engaging members for adjustable movement toward and away from said rotational axis to vary the degree of exposure of said teeth in said row thereof past said outer longitudinal edge of said crop-engaging member and thereby the aggressiveness of said longitudinal edge in assisting the feeding of crop stalk material to said rear discharge outlet.

17. The row crop header as recited in claim 16, wherein said fastening means includes:

means defining a plurality of elongated slots in one of said crop-engaging members and said extension member; and
a plurality of fasteners mounted to the other of said crop-engaging members and said extension member and extending through said slots of said one of said crop-engaging members and said extension member.

18. In a rotary crop feed assist device for a row crop harvesting header, the improvement comprising:
a plurality of angularly spaced crop-engaging members projecting radially from the rotational axis of said device and mountable for rotation about a common axis;
said crop-engaging members having a peripheral configuration for sweeping a rotational path in the shape of an inverted truncated cone which imposes a downward force on crop stalk material being fed past said members.

19. The rotary device as recited in claim 18, wherein said crop-engaging members have outer longitudinal edges which taper downwardly and inwardly toward said rotational axis and sweep along said inverted truncated cone-shaped rotational path upon rotation of said members.

20. The rotary device as recited in claim 19, wherein said crop-engaging members are connected together at longitudinally-extending inner portions thereof.

21. The rotary device as recited in claim 19, wherein said outer longitudinal edges on said crop-engaging members are relatively straight and smooth for facilitating sliding of crop stalk material downwardly along said longitudinal edges concurrently as the stalk material is fed past said members.

22. The rotary device as recited in claim 19, further comprising:
at least one extension member having a row of teeth defined along one edge thereof; and
means for releasably fastening said extension member on one of said crop-engaging members for adjustable movement toward and away from said rotational axis to vary the degree of exposure of said teeth in said row thereof past said outer longitudinal edge of said crop-engaging member and thereby the aggressiveness of said longitudinal edge in assisting the feeding of crop stalk material past said members.

23. The rotary device as recited in claim 22, wherein said fastening means includes:
means defining a plurality of elongated slots in one of said crop-engaging members and said extension member; and
a plurality of fasteners mounted to the other of said crop-engaging members and said extension member and extending through said slots of said one of said crop-engaging members and said extension member.

* * * * *